(12) United States Patent
Kanaya et al.

(10) Patent No.: US 8,351,007 B2
(45) Date of Patent: Jan. 8, 2013

(54) LIQUID CRYSTAL DISPLAY DEVICE WITH ENHANCED BRIGHTNESS

(75) Inventors: Yasuhiro Kanaya, Tokyo (JP); Daiki Nakajima, Shiga (JP); Keiichi Yagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 12/485,162

(22) Filed: Jun. 16, 2009

(65) Prior Publication Data

US 2009/0310053 A1  Dec. 17, 2009

(30) Foreign Application Priority Data

Jun. 16, 2008 (JP) ................................. 2008-157229

(51) Int. Cl.
  *G02F 1/1343* (2006.01)
  *G02F 1/136* (2006.01)
(52) U.S. Cl. .............................. 349/141; 349/43; 349/46
(58) Field of Classification Search .................... 349/43, 349/138, 141, 46
See application file for complete search history.

(56) References Cited

U.S. PATENT DOCUMENTS

| 6,630,977 | B1 * | 10/2003 | Yamazaki et al. | ............. 349/141 |
| 2008/0061394 | A1 * | 3/2008 | Nakagawa | ................... 257/435 |

FOREIGN PATENT DOCUMENTS

| JP | 2007-052128 | | 3/2007 |
| JP | 2007052128 A | * | 3/2007 |
| JP | 2007-226200 | | 9/2007 |
| JP | 2008-058573 | | 3/2008 |
| JP | 2008-064947 | | 3/2008 |
| JP | 2008-089685 | | 4/2008 |

OTHER PUBLICATIONS

Japanese Patent Office Action corresponding to Japanese Serial No. 2008-157229 dated Apr. 20, 2010.

* cited by examiner

*Primary Examiner* — Nathanael R Briggs
(74) *Attorney, Agent, or Firm* — SNR Denton US LLP

(57) ABSTRACT

A liquid crystal display device with enhanced brightness through improving a partial structure for applying potential to a pixel electrode is provided. The liquid crystal display device includes: a pixel electrode with a plurality of openings; an opposite electrode disposed to face the pixel electrode with an insulating layer in between; a liquid crystal layer disposed on an opposite side of the pixel electrode from the opposite electrode; a selection line utilized to select a pixel; a thin film transistor disposed on the opposite side of the opposite electrode from the pixel electrode as to drive the pixel and utilizing a part of the selection line as a gate thereof; and an interlayer conductor connecting between the thin film transistor and the pixel electrode. The opposite electrode has an opposite electrode hole which allows the interlayer conductor to pass therethrough, and the opposite electrode hole partly overlaps the selection line.

4 Claims, 13 Drawing Sheets

VOLTAGE APPLIED (WHITE)

NO VOLTAGE APPLIED (BLACK)

LIQUID CRYSTAL DISPLAY DEVICE WITH ENHANCED BRIGHTNESS

BACKGROUND OF THE INVENTION

1. Field of the Invention

The present invention relates to a liquid crystal display device in which displaying is performed by a liquid crystal in an in-plane switching mode.

2. Description of the Related Art

There is a liquid crystal display device having a liquid crystal structure of an in-plane switching mode such as an FFS (Fringe Field Switching) mode. The liquid crystal display device in the FFS mode has an opposite electrode. A pixel electrode having a slit-shaped opening is disposed to oppose the opposite electrode through an insulating layer. Further, a liquid crystal layer is disposed above the pixel electrode. A conductive contact is disposed to penetrate the insulating layer in the layer stack direction, and the pixel electrode and a TFT (Thin Film Transistor) for driving the pixel electrode are made conductive via the conductive contact. In such a liquid crystal display device, when voltage is applied from a data line connected to the TFT to the pixel electrode, an electric field is generated from the pixel electrode toward the opposite electrode below the pixel electrode via the liquid crystal layer and the slit, and thereby, a transverse electric field is applied to the liquid crystal layer to perform driving. Japanese Unexamined Patent Application Publication No. 2008-64947 discloses a liquid crystal display device in the FFS mode.

SUMMARY OF THE INVENTION

Since the liquid crystal display device is requested to improve brightness in recent years, an attempt to increase the aperture ratio is being made. To increase the aperture ratio, it is necessary to enlarge the area of the light transmission region as much as possible. As described above, since the conductive contact is necessary to connect the pixel electrode and the TFT and the space for disposing the conductive contact is necessary, a sufficiently high aperture ratio is not necessarily obtained. There is, however, no proposal for improvement in this regard.

It is therefore desirable to provide a liquid crystal display device capable of increasing brightness by improving a structure for applying drive voltage to a pixel electrode.

A liquid crystal display device according to an embodiment of the present invention includes: a pixel electrode with a plurality of openings; an opposite electrode disposed so as to face the pixel electrode with an insulating layer in between; a liquid crystal layer disposed on an opposite side of the pixel electrode from the opposite electrode; a selection line utilized to select a pixel; a thin film transistor disposed on the opposite side of the opposite electrode from the pixel electrode so as to drive the pixel, and utilizing a part of the selection line as a gate thereof; and an interlayer conductor electrically connecting between the thin film transistor and the pixel electrode. The opposite electrode has an opposite electrode hole which allows the interlayer conductor to pass therethrough, and the opposite electrode hole partly overlaps the selection line.

In the liquid crystal display device according to the embodiment of the invention, incident light from a backlight passes through the pixel electrode and the opposite electrode and enters the liquid crystal layer and, on the other hand, is blocked by the selection line and the interlayer conductor. When the thin film transistor is turned on by a signal supplied from the selection line and image signal voltage is applied to the pixel electrode, an electric field is generated from the pixel electrode toward the opposite electrode below the pixel electrode via the liquid crystal layer and the opening in the pixel electrode. Thereby, a transverse electric field is applied to the liquid crystal layer, liquid crystal molecules in the liquid crystal layer selectively turn, and light passing through the liquid crystal layer is modulated. Since the opposite electrode hole which allows the interlayer conductor to pass therethrough is provided in a position overlapping the selection line, as a result, the interlayer conductor which blocks incident light is positioned extremely close to the selection line. Therefore, the opening region in the pixel electrode may be enlarged to a position closer to the selection line as compared with that in the conventional technique. Moreover, since a part of the selection line is used as the gate of the thin film transistor, as compared with the case of leading a gate part separately from a selection line to configure a thin film transistor, a light shield region generated by the space for disposing the thin film transistor is accordingly reduced, and the opening region in the pixel electrode is enlarged by an amount of the reduction.

In the liquid crystal display device according to an embodiment of the invention, preferably, the interlayer conductor has a first extending portion which extends along a plane of a layer between the opposite electrode and the selection line so as to cover an overlap region where the opposite electrode hole partly overlaps the selection line. In this case, a leak electric field from the selection line to the liquid crystal layer via the opposite electrode hole is blocked by a part of the interlayer conductor extending along the layer stack plane, and disturbance of the electric field is suppressed. Preferably, the interlayer conductor further has a second extending portion different from the first extending portion, a first inner edge region of the opposite electrode, which is a part of a whole inner edge region surrounding the opposite electrode hole, faces the overlap region, and a second inner edge region of the opposite electrode, which is different from the first inner edge region, overlaps the second extending portion of the interlayer conductor or the pixel electrode, or overlaps both of the second extending portion of the interlayer conductor and the pixel electrode. In the case where the second inner edge region of the opposite electrode is covered with the pixel electrode, disturbance of the electric field which may occur when the second inner edge region is not covered with the pixel electrode is suppressed. Alternatively, in the case where the part of the interlayer conductor overlaps the second inner edge region, a part where no opposite electrode exists (liquid crystal controllability is low) is covered with the part of the interlayer conductor. Accordingly, even if the electric field generated between the pixel electrode and the opposite electrode is disturbed, a part of the interlayer insulating film blocks light. As a result, the part of low liquid crystal controllability is prevented from contributing to display. Therefore, drop in the contrast is prevented.

In the liquid crystal display device according to the embodiment of the present invention, since the opposite electrode hole which allows the interlayer conductor to pass therethrough is located in a position so as to overlap the selection line, the area of the transmission region may be enlarged, and display brightness improves. In addition, since the opening in the pixel electrode may be enlarged to a position closer to the selection line as compared with the conventional technique, the opening area is increased, and display contrast improves. Moreover, by utilizing a part of the selection line as a gate part of the thin film transistor, the space for disposing the thin film transistor is reduced, so that the area of the light transmission region may be further enlarged by the amount of the reduced space, and the opening in the pixel electrode may be enlarged, thereby, in this regard as well, contributing to improvement of the display brightness and display contrast.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

First Embodiment

Figure 1:
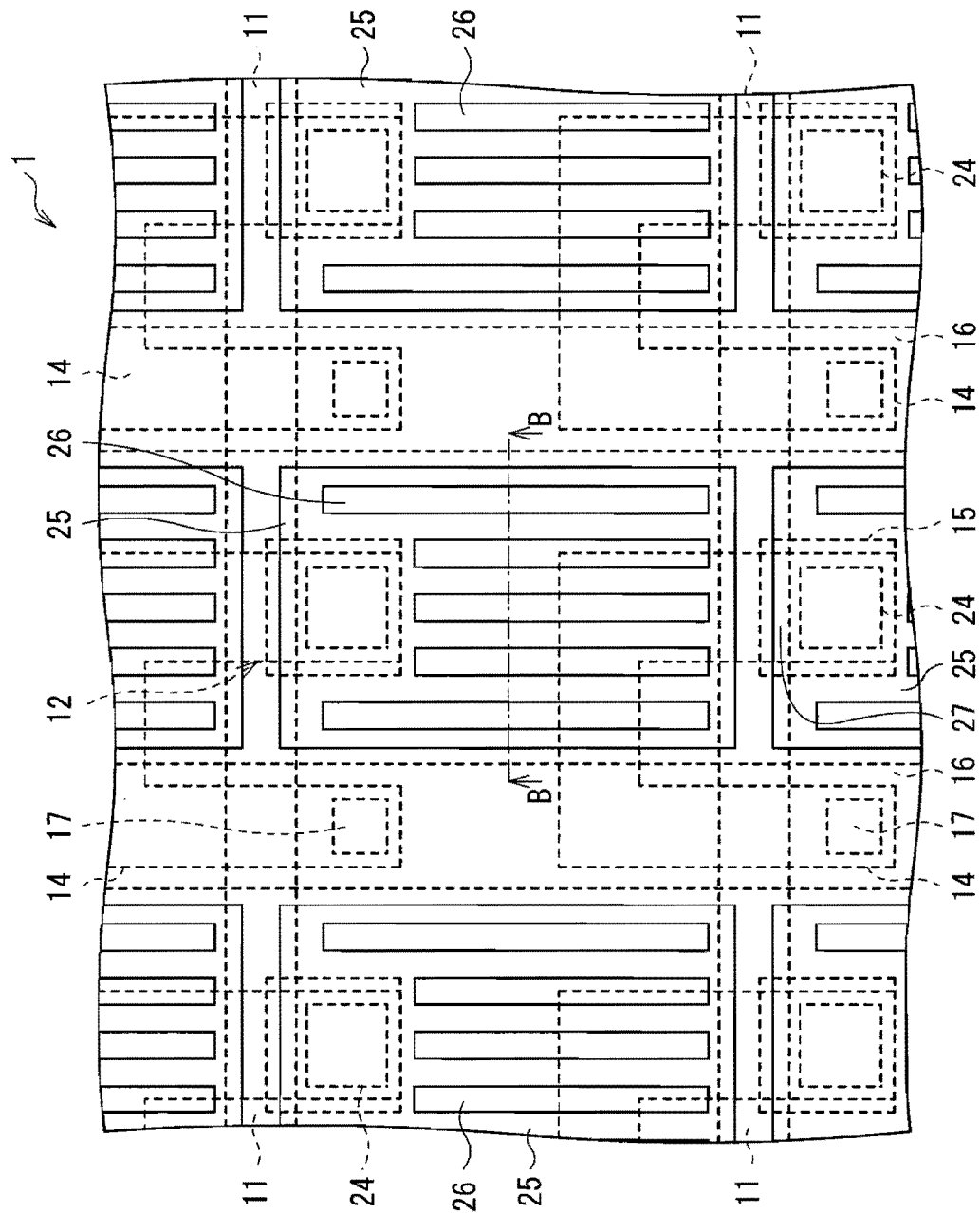
FIG. 1 is a partly-enlarged plan view of a liquid crystal display device according to a first embodiment.
Figure 2:
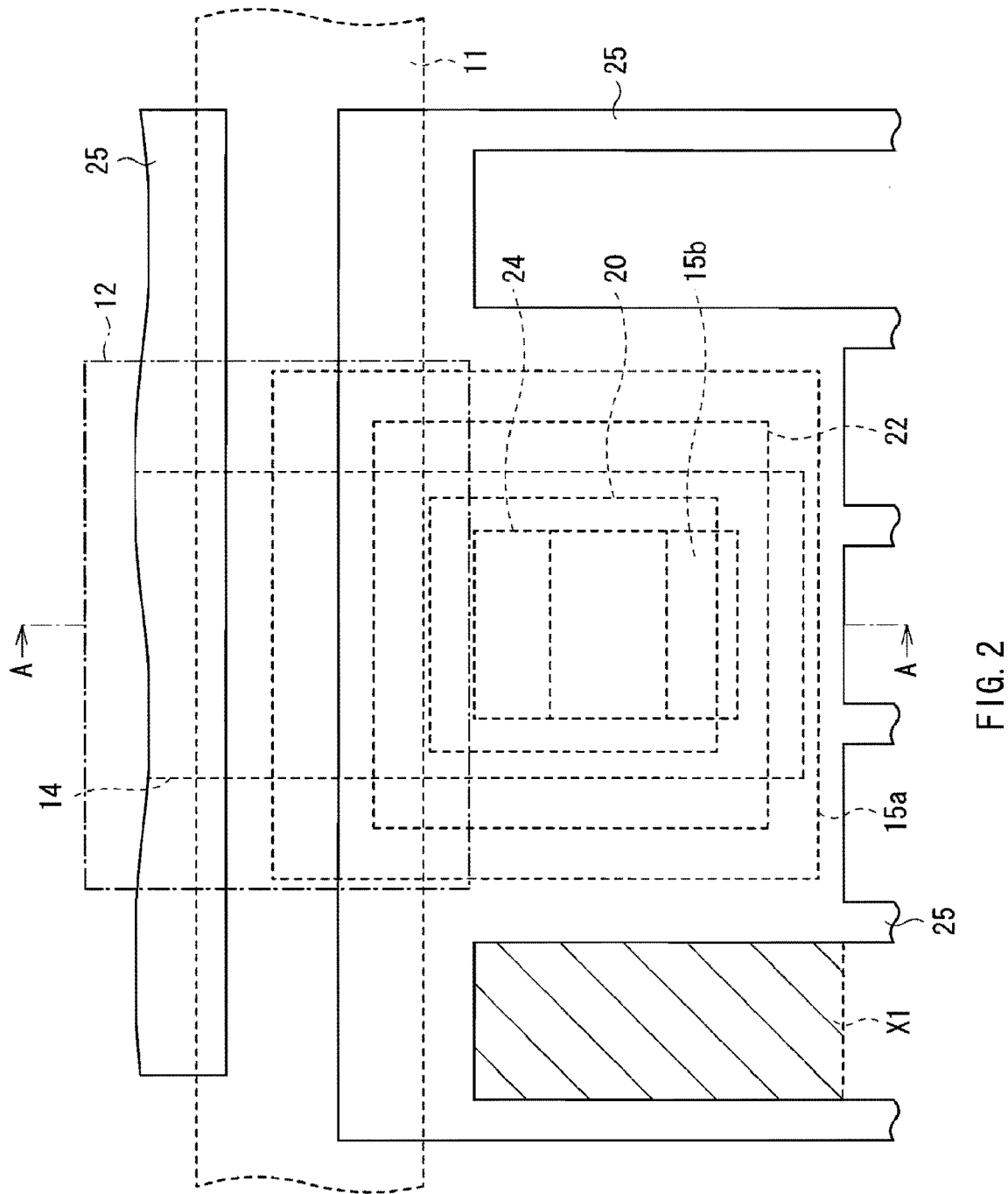
FIG. 2 is an enlarged plan view of a portion of a first contact in the liquid crystal display device illustrated in FIG. 1.
Figure 3:
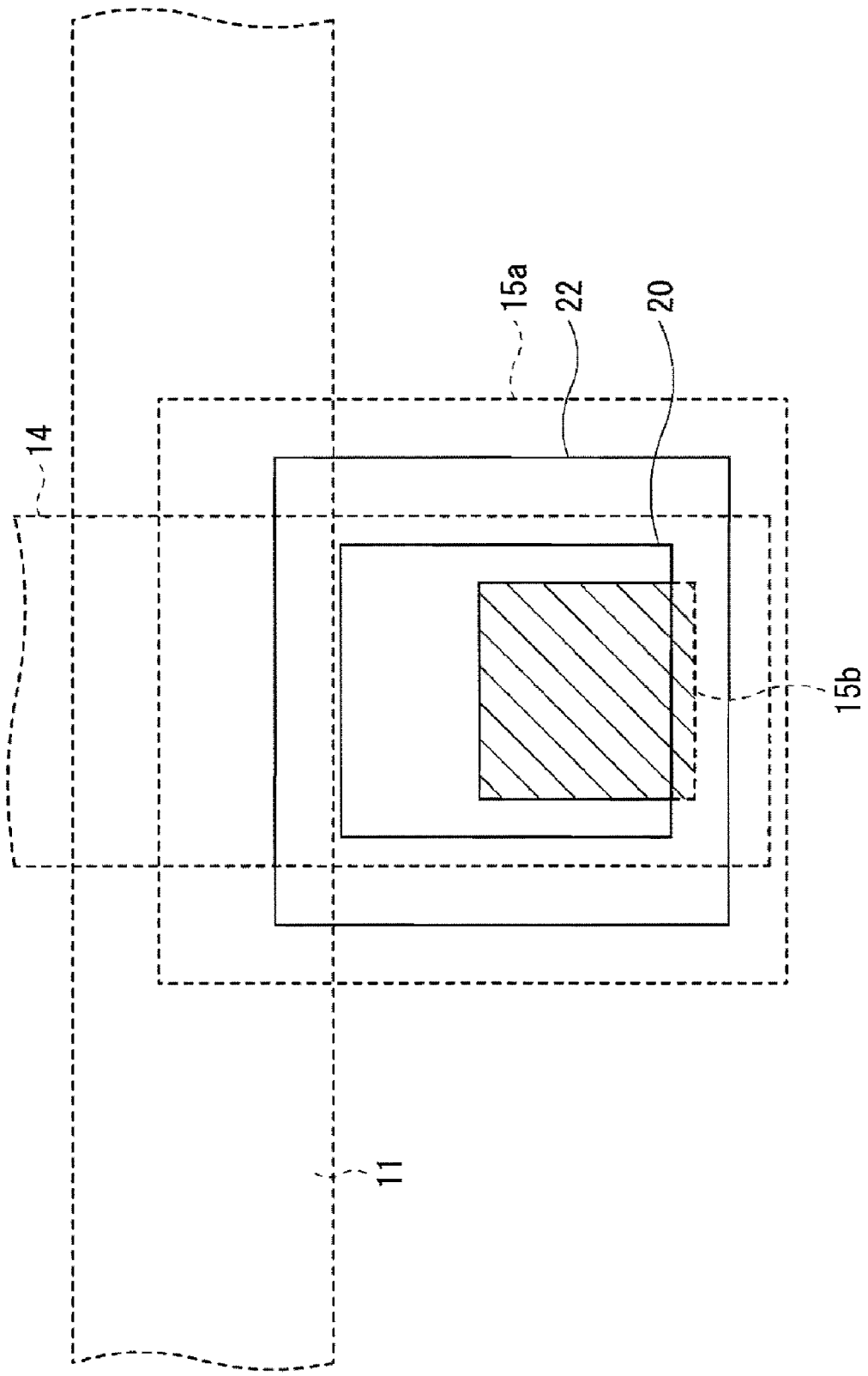
FIG. 3 is a diagram illustrating the positional relationship in the plane direction of main parts around the area where the first contact of the liquid crystal display device is provided.
Figure 4:
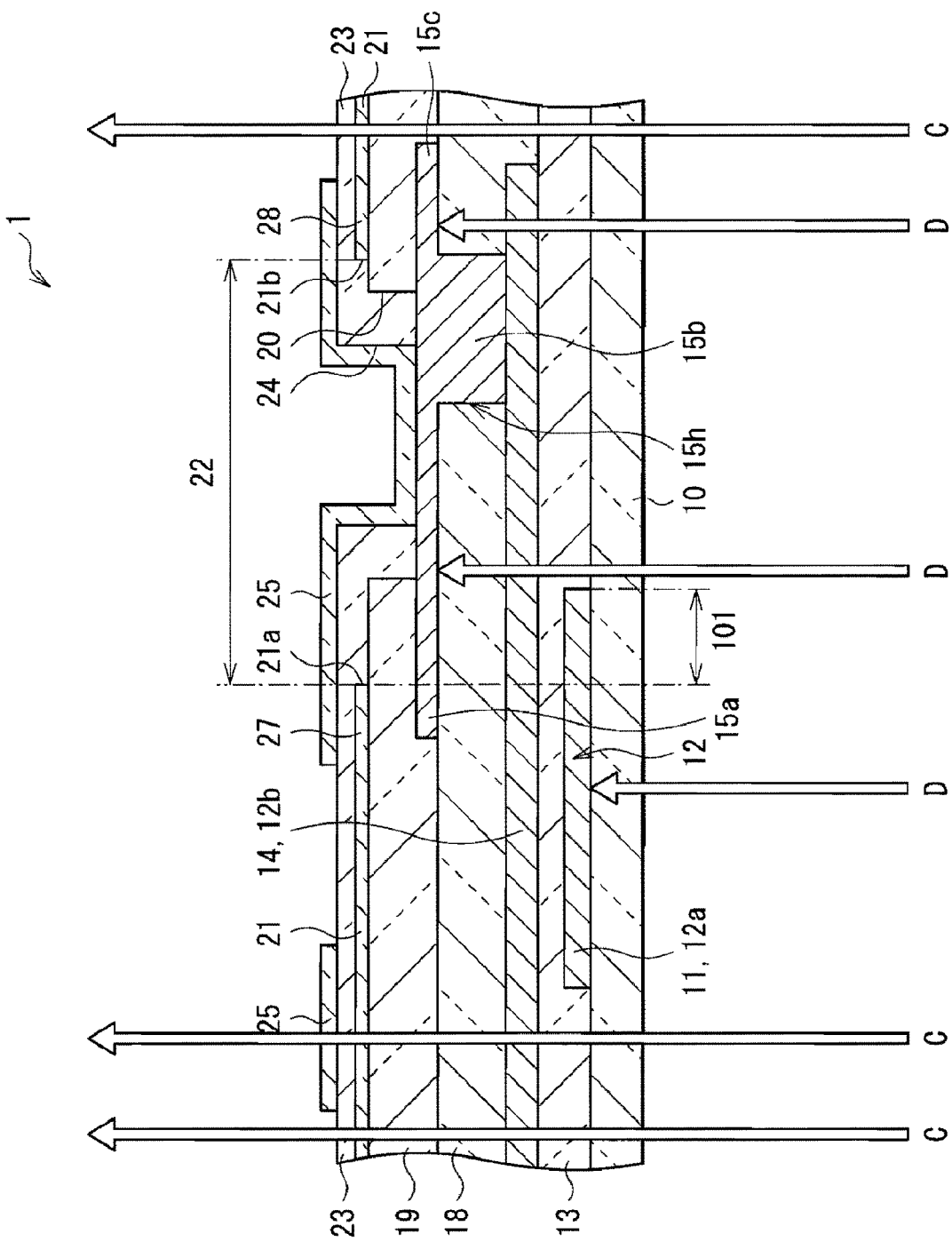
FIG. 4 is a cross section taken along line A-A of FIG. 2.

FIG. 1 is a plan view illustrating the configuration of a main part of a liquid crystal display device according to a first embodiment of the present invention. FIGS. 2 and 3 are enlarged views of a part (a part around a contact) in the liquid crystal display device illustrated in FIG. 1. In FIG. 3, a part of the components (such as a pixel electrode) is not illustrated. FIG. 4 illustrates a sectional structure taken along line A-A of FIG. 2.

As illustrated in FIG. 4, a liquid crystal display device 1 is provided with a glass substrate 10. On the top face of the glass substrate 10, a plurality of gate lines 11 as selection lines extend in the row direction (the direction perpendicular to the drawing surface). In a region of one pixel, the gate line 11 serves as a gate 12a of a switching element for driving the pixel, i.e., a thin film transistor (TFT) 12. On the top face of the glass substrate 10, a gate insulating film 13 is provided, and the gate lines 11 are covered with the gate insulating film 13.

On the top face of the gate insulating film 13, a semiconductor layer 14 is provided. In the present embodiment, the semiconductor layer 14 has a substantially U-shape in plan view as illustrated in FIG. 1. One of arm parts of the U shape crosses the gate line 11. The region of the semiconductor layer 14, where the gate line 11 and the semiconductor layer 14 cross each other, serves a channel 12b of the TFT 12. The gate 12a, the gate insulating film 13, and the channel 12b of the semiconductor layer 14 configure a main part of the TFT 12.

A first contact 15 (which will be described later) as an interlayer conductor is provided in one end (source) of the U shape of the semiconductor layer 14, and a second contact 17 is provided in the other end (drain). The first contact 15 is provided to connect the source of the semiconductor layer 14 and a pixel electrode 25, which will be described later, in the layer stack direction. The second contact 17 is provided to connect a data line 16 extending in the column direction and the drain of the semiconductor layer 14 in the layer stack direction. A data signal (pixel voltage) is supplied from the data line 16 to the semiconductor layer 14 via the second contact 17. The data signal further passes between the source and drain of the TFT 12 and supplied from the semiconductor layer 14 (drain) to the pixel electrode 25 via the first contact 15.

Over the semiconductor layer 14 and the gate insulating film 13, a transistor protection film 18 having insulating property is provided so as to cover the semiconductor layer 14 and the gate insulating film 13 (FIG. 4). In the transistor protection film 18, a contact hole 15h is provided in a position adjacent to the gate line 11 and is filled with a conductor, thereby configuring the first contact 15. The first contact 15 has a part (extension part, or a first extending portion) 15a extending in the direction toward the gate line 11 along the top face of the transistor protection film 18, a part (penetration part) 15b penetrating the transistor protection film 18 in the layer stack direction, and an extension part 15c (a second extending portion) extending in three directions other than the extension direction of the extension part 15a. The front end part of the extension part 15a extends to a position overlapping the gate line 11.

On the transistor protection film 18 and the first contact 15, an interlayer insulating film 19 is provided so as to cover the transistor protection film 18 and the first contact 15. In the interlayer insulating film 19, an interlayer insulating film hole 20 reaching the top face of the first contact 15 is formed in the position where the first contact 15 is formed.

An opposite electrode 21 is formed on the top face of the interlayer insulating film 19. In the opposite electrode 21, an opposite electrode hole 22 having a rectangular shape is formed. The opposite electrode hole 22 is formed so as to include the interlayer insulating film hole 20 and to be larger than the interlayer insulating film hole 20 in the plane direction. As a result, the interlayer insulating film hole 20 is positioned in the region on the inside of the opposite electrode hole 22. The opposite electrode hole 22 is formed above the gate line 11 so as to overlap the gate line 11. That is, a part (inner edge region 27) of an inner edge region surrounding the opposite electrode hole 22 is terminated above the gate line 11. An overlap region 101 where the gate line 11 and the opposite electrode hole 22 overlap is covered with the extension part 15a of the first contact 15. In other words, the front end part of the extension part 15a of the first contact 15 extends to a portion passing the position of an inner edge 21a of the opposite electrode hole 22 between the opposite electrode 21 and the gate line 11 to be terminated at the portion. Similarly, a region 28 other than the inner edge region 27 in the inner edge region surrounding the opposite electrode hole 22 also overlaps the other extension part 15c of the first contact 15 above the first contact 15. In other words, the front end part of the other extension part 15c of the first contact 15 extends to a portion passing the position of an inner edge 21b other than the part overlapping the semiconductor layer 14, of the inner edge 21a of the opposite electrode hole 22 to be terminated at the portion.

The interlayer insulating film 19, the opposite electrode 21, and the interlayer insulating film hole 20 are covered with a pixel insulating film 23 (insulating layer). In the pixel insulating film 23, a pixel insulating film hole 24 penetrating the inside of the opposite electrode hole 22 in the opposite electrode 21 and the interlayer insulating film hole 20 in the interlayer insulating film 19 in the layer stack direction and reaching the top face of the first contact 15 is formed.

On the pixel insulating film 23, the pixel electrodes 25 are formed on the pixel unit basis. As illustrated in FIG. 1, the pixel electrode 25 is disposed across two neighboring gate lines 11 so as to overlap the gate lines. As illustrated in FIGS. 1 and 4, the pixel electrode 25 covers the inner face of the pixel insulating film hole 24 (the inner wall face and the top face of the first contact 15), so that the drain of the semiconductor layer 14 and the pixel electrode 25 are electrically connected to each other via the first contact 15. The pixel electrode 25 is formed in a position and a size so as to completely cover the opposite electrode hole 22. In the pixel electrode 25, a plurality of elongated openings (slits 26) are formed along a direction parallel to the data line 16. The slits 26 (three slits 26 in FIG. 1) positioned in a center portion of the slits 26 extend close to the TFT 12, that is, close to the first contact 15, and the slits 26 (two slits in FIG. 1) in the peripheral parts extend very close to the gate lines. A cross section taken along line B-B of FIG. 1 is as illustrated in FIG. 6 which will be described later.

Figure 5B:
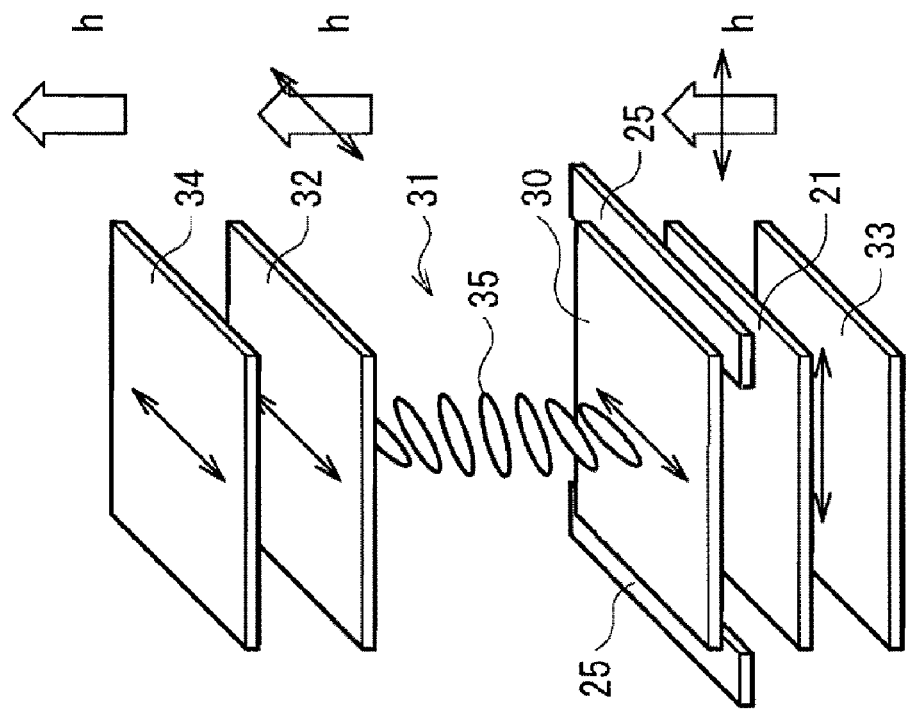
FIGS. 5A and 5B are perspective views each illustrating a schematic configuration of the liquid crystal display device.
Figure 5A:
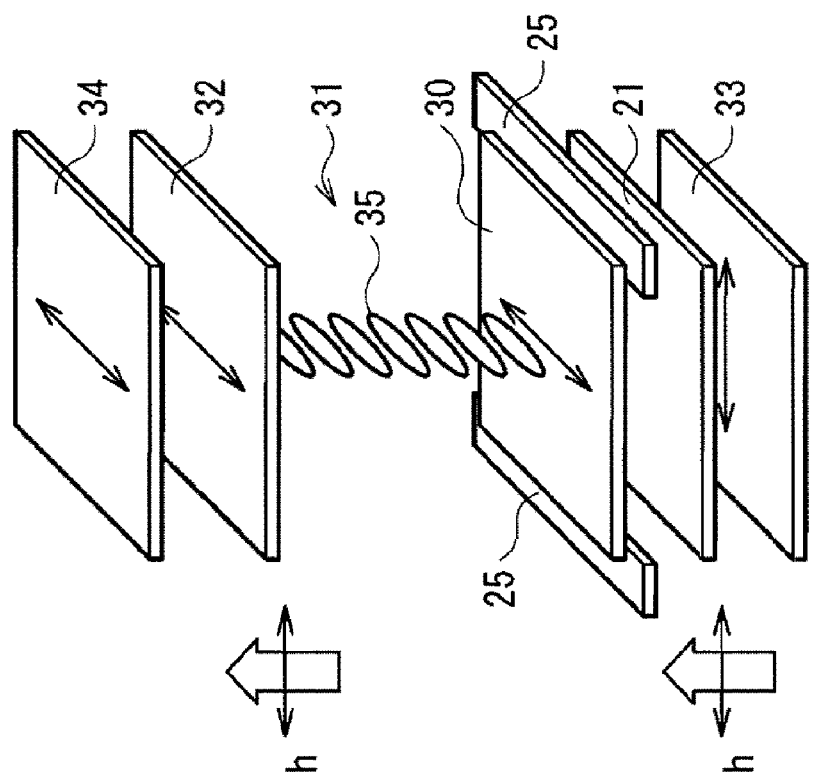

FIGS. 5A and 5B schematically illustrate a perspective structure of the liquid crystal display device. As illustrated in FIGS. 5A and 5B, on the top face side (light outgoing side) of the pixel electrode 25, a first alignment film 30, a liquid crystal layer 31, a second alignment film 32, and a second polarizer 34 are disposed. On the under face side (light incident side) of the glass substrate 10 (opposite electrode 21), a first polarizer 33 is disposed.

The liquid crystal display device 1 having such a configuration is manufactured, for example, as follows. First, as a switching element for driving pixels of the liquid crystal display device 1, the TFT 12 is formed. To form the TFT 12, first, a metal film serving as the gate 12a (the gate line 11) of the TFT 12 is formed on the glass substrate 10. The metal film may be formed by depositing a metal material such as molybdenum by using, for example, sputtering or the like. After that, a mask is formed on the top face of the metal film by using the photolithography technique, the metal film exposed from an opening in the mask is etched and, after that, the mask is removed. In such a manner, the gate 12a of the TFT 12 also serving as the gate line 11 is formed.

Next, the gate insulating film 13 covering the glass substrate 10 and the gate line 11 is formed. The gate insulating film 13 may be formed by depositing an insulating material such as silicon nitride on the top face of the glass substrate 10 by using a film forming method such as chemical vapor deposition (CVD).

Next, the semiconductor layer 14 is formed. To form the semiconductor layer 14, first, a semiconductor material such as amorphous silicon which will become the semiconductor layer 14 is deposited on the top face of the gate insulating film 13 by using a film forming method such as CVD. After that, to obtain the semiconductor layer 14 having the shape illustrated in FIG. 1, a mask is formed on the top face of the semiconductor material by using the photolithography technique, the semiconductor material exposed from an opening in the mask is etched and, after that, the mask is removed. As a result, the semiconductor layer 14 having one end to which the first contact 15 is connected, the other end to which the second contact 17 is connected, and the part serving as the channel 12b of the TFT 12 is formed.

Next, the transistor protection film 18 protecting the TFT 12 is formed on the top face of the semiconductor layer 14 and the gate insulating film 13. To form the transistor protection film 18, first, using a film forming method such as CVD, an insulating material such as silicon nitride is deposited on the top face of the gate insulating film 13 to cover the semiconductor layer 14. After that, a mask is formed on the top face of the gate insulating film 13 by using the photolithography technique so that the first contact 15 and the second contact 17 are disposed in the layer stack direction. Then, the insulating material exposed from the opening in the mask is etched and, after that, the mask is removed. As a result, the transistor protection film 18 is formed, and the transistor protection film 18 is configured to have the first contact hole 15h in which the penetration part 15b of the first contact 15 is disposed and a second contact hole in which the second contact 17 is disposed.

Next, a transistor contact metal film which becomes the first contact 15 and the data line 16 is formed on the top face of the transistor protection film 18. To form the transistor contact metal film, first, by using a film forming method such as sputtering, for example, three layers of titanium, aluminum, and titanium are stacked on the top face of the transistor protection film 18. After that, a mask is formed on the top face of the transistor contact metal film by using the photolithography technique. Then, parts which are not covered with the mask are etched, and the mask is removed. As a result, the first contact 15 including the part extending in the plane direction, i.e., including the part in which an end of the transistor contact metal film in the inner edge region overlaps the gate line 11 in plan view, and the data line 16 extending in the column direction, are formed. Therefore, the first contact 15 is disposed in a layer between the opposite electrode 21 and the gate line 11.

Next, the interlayer insulating film 19 is formed on the top face of the transistor protection film 18, the first contact 15, and the data line 16. The interlayer insulating film 19 can be made of an insulating material such as acrylic resin. In this case, if the acrylic resin is photosensitive, the interlayer insulating film hole 20 is easily formed by using the photolithography technique. Thereby, the interlayer insulating film 19 bringing insulation between the first contact 15 and the data line 16 and the opposite electrode 21, and from which a part of the first contact 15 is exposed via the interlayer insulating film hole 20 is obtained.

Next, the opposite electrode 21 as a transparent electrode is formed on the top face of the interlayer insulating film 19. To form the opposite electrode 21, first, by using a film forming method such as sputtering, for example, an electrode material such as indium oxide is formed on the top face of the interlayer insulating film 19. After that, to form the opposite electrode hole 22, a mask is formed on the top face of the opposite electrode 21 by using the photolithography technique. Then, the electrode material exposed from an opening in the mask is etched and, after that, the mask is removed. As a result, the opposite electrode 21 having the opposite electrode hole 22 is formed. As illustrated in FIG. 4, the opposite electrode hole 22 of the present embodiment is formed to be larger than the interlayer insulating film hole 20 and to be smaller than the part extending in the plane direction of the first contact 15.

Therefore, the inner edge region of the inner edge 21a forming the opposite electrode hole 22 overlaps both of the first contact 15 and the gate line 11 in plan view.

Next, to apply the electric field to the liquid crystal layer 31, the pixel insulating film 23 is formed on the top face of the opposite electrode 21. The pixel insulating film 23 is formed by depositing, for example, a dielectric such as silicon nitride on the top face of the opposite electrode 21 using a film deposition method such as CVD. Then, a mask is formed on the top face of the dielectric layer by using the photolithography technique. Thereafter, a part which is not covered with the mask is etched, and the mask is removed. Thereby, the pixel insulating film 23 having the pixel insulating film hole 24 is formed, and the pixel insulating film hole 24 of the present embodiment is disposed on the inside of the interlayer insulating film hole 20 and the opposite electrode hole 22.

Next, the pixel electrode 25 which applies the potential for driving the liquid crystal is formed on the top face of the pixel insulating film 23. The pixel electrode 25 may be formed by depositing, for example, an electrode material such as indium oxide using a film depositing method such as sputtering and, after that, forming a pattern covering the slit 26 and the opposite electrode hole 22 in plan view, so that the electric field is applied across the pixel electrode 25 and the opposite electrode 21 via the pixel insulating film 23, by using a mask obtained by the photolithography technique and etching.

After that, the first alignment film 30, the liquid crystal layer 31, the second alignment film 32, and the second polarizer 34 are disposed on the top face side of the pixel electrode 25, and the first polarizer 33 is disposed on the under face side of the glass substrate 10, thereby obtaining the liquid crystal display device 1.

Figure 6A:
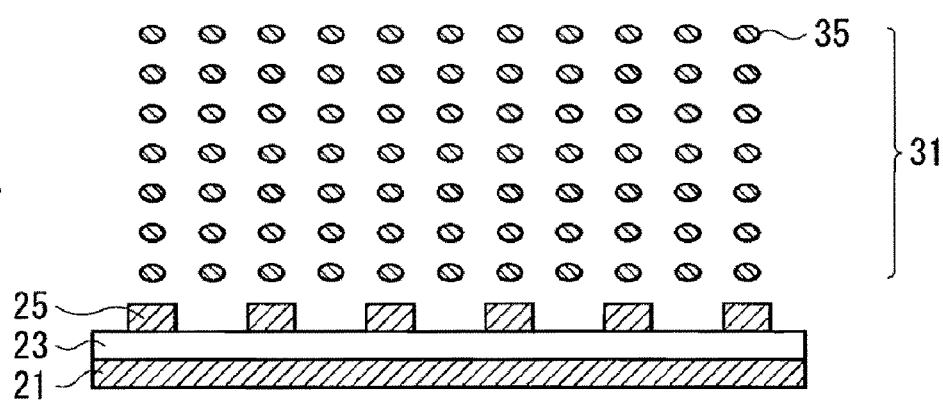
FIGS. 6A and 6B are cross sections of an opposite electrode, a pixel electrode, and a liquid crystal layer for explaining operation of the liquid crystal display device.
Figure 6B:
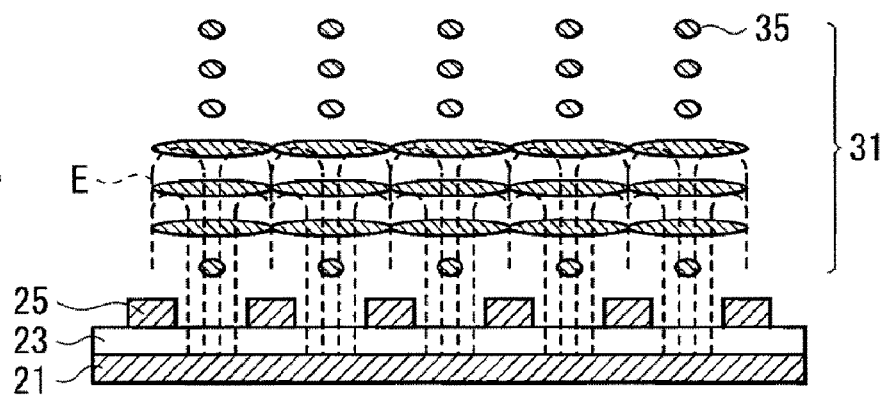

Next, the operation of the liquid crystal display device 1 of the present embodiment will be described. First, referring to FIGS. 5A and 5B and FIGS. 6A and 6B, basic operation will be described. FIGS. 5A and 5B illustrate the perspective configuration of the liquid crystal display device 1. FIGS. 6A and 6B illustrate a cross section (taken along line B-B of FIG. 1) of the liquid crystal display device 1. FIGS. 5A and 6A illustrate a state in which no voltage is applied, and FIGS. 5B and 6B illustrate a state in which the voltage is applied.

Light is incident (arrows C and D in FIG. 4) on the liquid crystal display device 1 from the rear side (down side in FIG. 1) of the glass substrate 10. The incident light D is blocked by portions made of metal such as the gate line 11, the first contact 15, the second contact 17, the data line 16, and the like, and passes through the other parts and enters the liquid crystal layer 31 (incident light C).

The light incident on the liquid crystal layer 31 is subject to space modulation in an FFS mode as described below when the light passes through the liquid crystal layer 31.

As illustrated in FIGS. 5A and 6A, in a state where no voltage is applied across the opposite electrode 21 and the pixel electrode 25, the axis of a liquid crystal molecule 35 as a component of the liquid crystal layer 31 is orthogonal to the transmission axis of the first polarizer 33 on the incidence side, and is parallel with the transmission axis of the second polarizer 34 on the outgoing side. Consequently, the incident light "h" having passed through the first polarizer 33 on the incident side reaches the second polarizer 34 on the outgoing side without causing a phase difference in the liquid crystal layer 31 and is absorbed, so that black display is resulted.

On the other hand, as illustrated in FIGS. 5B and 6B, in a state where voltage is applied across the opposite electrode 21 and the pixel electrode 25, the alignment direction of the liquid crystal molecules 35 is turned obliquely to the extension direction of the pixel electrode 25 by the electric field E generated between the pixel electrodes 25. At this time, the electric field intensity in the white display mode is optimized so that the liquid crystal molecule 35 positioned in the center in the thickness direction of the liquid crystal layer 31 turns at about 45 degrees. Thereby, a phase difference occurs in the incident light having passed through the first polarizer 33 on the incident side while passing through the liquid crystal layer 31. Thus, the light becomes linearly polarized light which is turned at 90 degrees and passes through the second polarizer 34 on the outgoing side, so that white display is resulted.

The action unique to the liquid crystal display device 1 of the present embodiment will now be described. First, a comparative example will be described for comparison.

Figure 11:
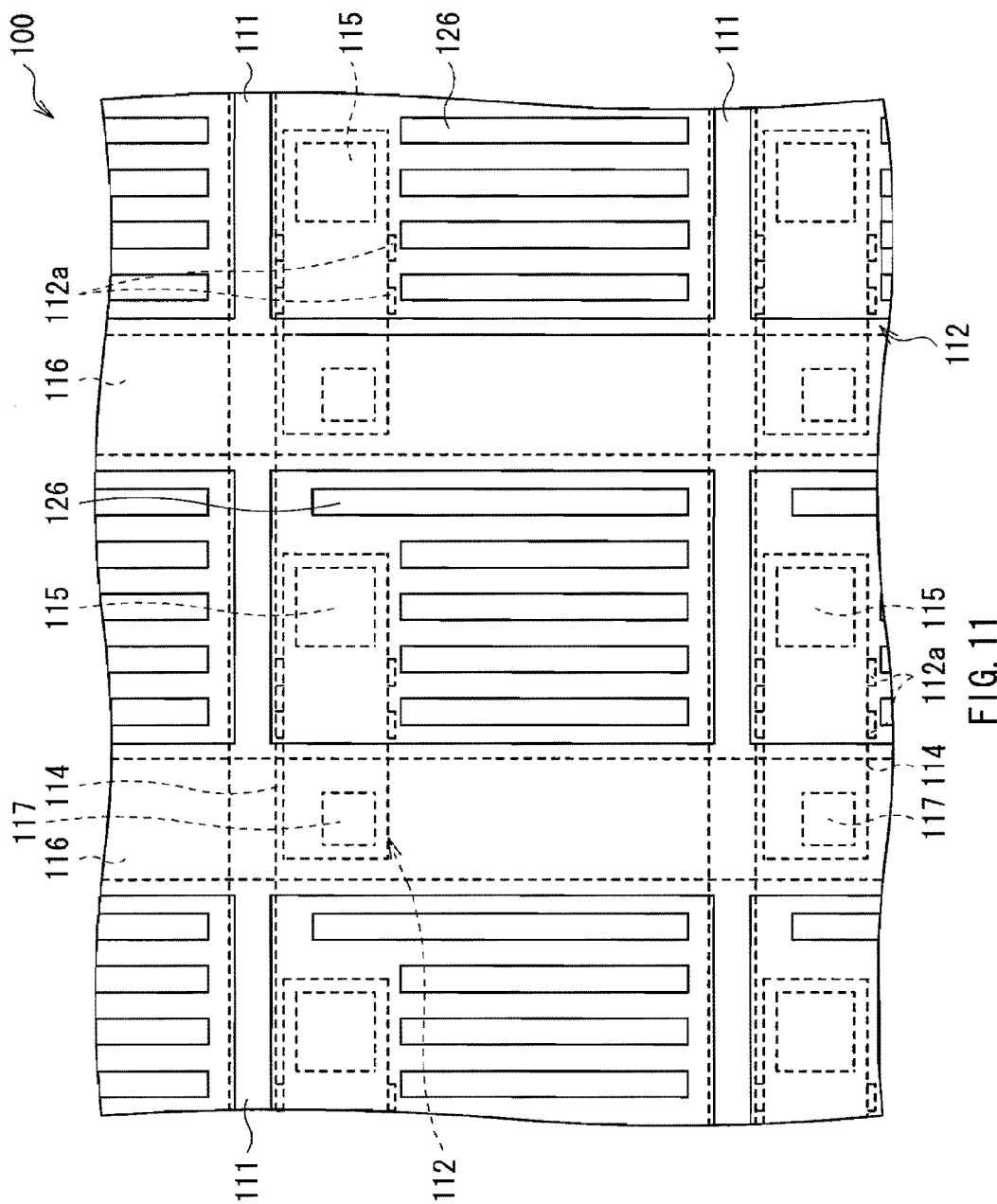
FIG. 11 is a partly-enlarged plan view of a liquid crystal display device according to a comparative example.
Figure 12:
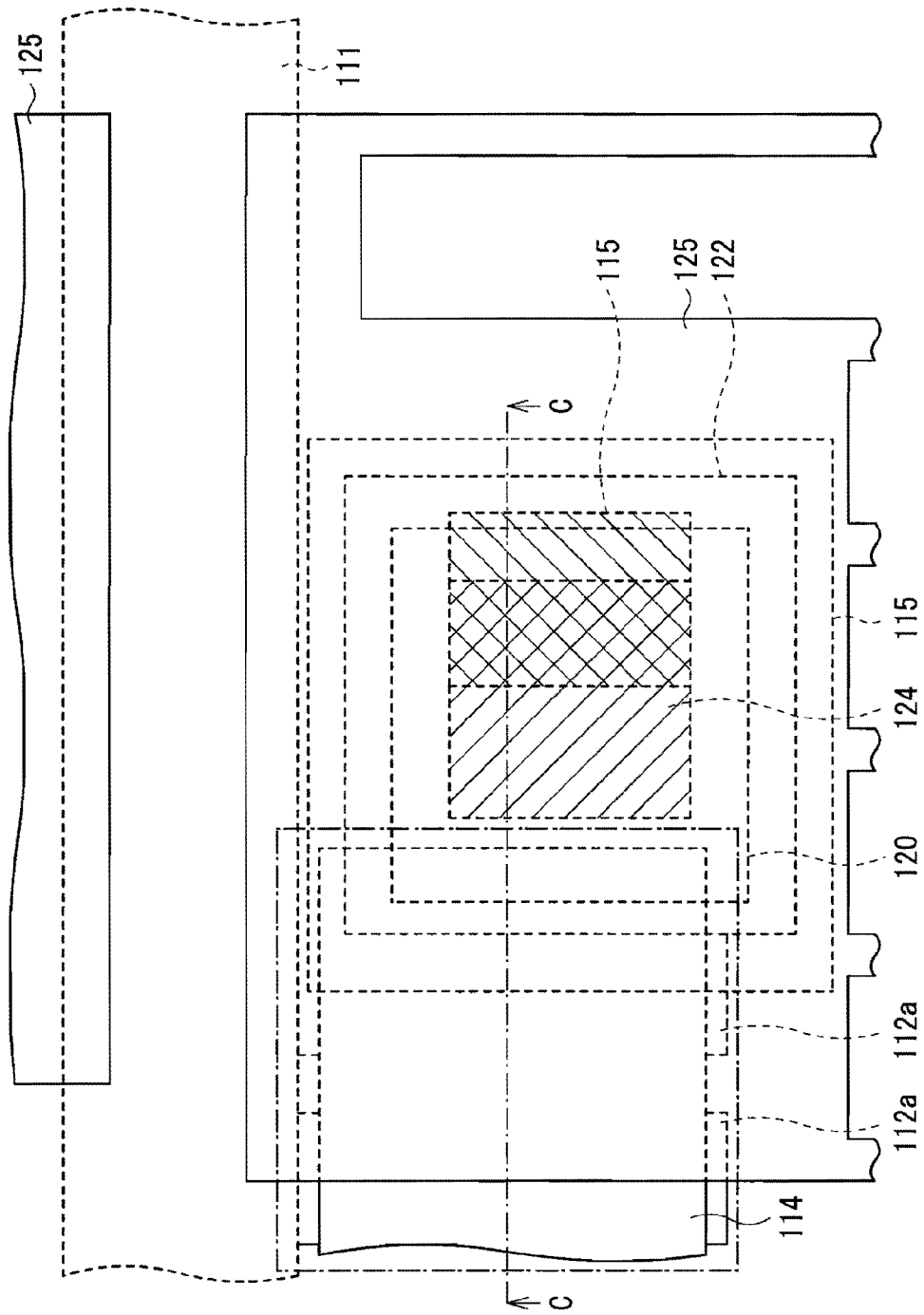
FIG. 12 is an enlarged plan view of a portion of a contact in the liquid crystal display device illustrated in FIG. 11.
Figure 13:
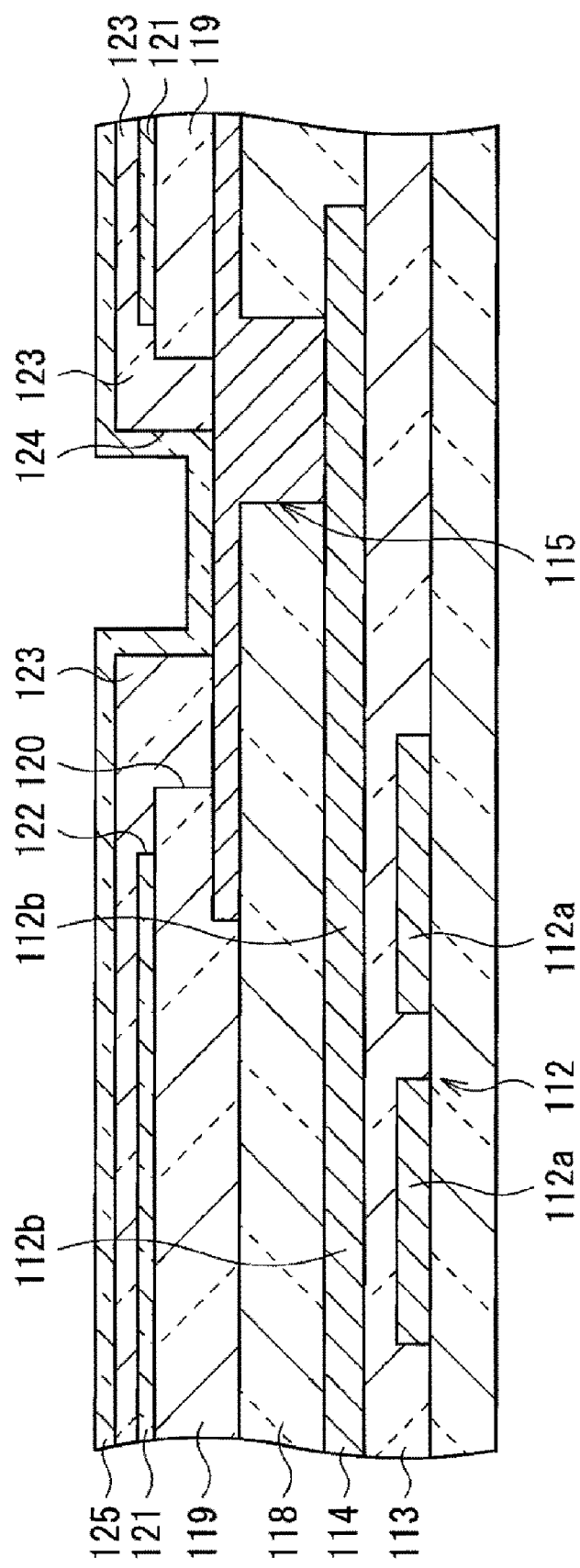
FIG. 13 is a cross section taken along line C-C of FIG. 12.

FIG. 11 is a plan view illustrating the configuration of a main part of a liquid crystal display device 100 according to a comparative example. FIG. 12 is an enlarged view of a part (a portion around a contact) in the liquid crystal display device 100. FIG. 13 is a cross section taken along line C-C of FIG. 12.

As in the liquid crystal display device 1 of the present embodiment, the liquid crystal display device 100 has gate lines 111 disposed in the row direction and data lines 116 disposed in the column direction. A gate 112a of a TFT 112 is configured by two metal films extending in the column direction, and one end of each of the metal films is connected to the gate line 111. A semiconductor layer 114 is disposed above the gate 112a via a gate insulating film 113 and extends along the gate lines 111. A part facing the gate 112a, of the semiconductor layer 114 serves as a channel 112b of the TFT 112. On the top face of the semiconductor layer 114, a transistor protection film 118 is provided. The transistor protection film 118 is provided with a first contact 115 penetrating the film 118 in the layer stack direction and reaching the top face of one end side of the semiconductor layer 114. The other end side of the semiconductor layer 114 is connected to the data line 116 via a second contact 117 (FIG. 11).

Above the transistor protection film 118 and the like, an interlayer insulating film 119, an opposite electrode 121, a pixel insulating film 123, and a pixel electrode 125 are provided. In the interlayer insulating film 119, an interlayer insulating film hole 120 reaching the top face of the first contact 115 is provided. The opposite electrode 121 is provided on the interlayer insulating film 119 and has an opposite electrode hole 122. The pixel insulating film 123 is provided so as to cover the opposite electrode 121 and the interlayer insulating film 119. In the pixel insulating film 123, a pixel electrode hole 124 reaching the top face of the first contact 115 is formed. On the pixel insulating film 123, the pixel electrode 125 in which a plurality of openings (slits) are formed is formed. The pixel electrode 125 is connected to the first contact 115 via the pixel electrode hole 124.

The gate 112a of the TFT 112, the first contact 115 making the pixel electrode 125 and the semiconductor layer 114 conductive and the like, are light shield regions which are made of a metal and do not transmit incident light, and are parts which do not contribute to display of the liquid crystal display device 100. Therefore, in the comparative example, the area of the light shield regions is relatively large for the following reasons.

(1) The first contact 115 is formed in a position completely apart from the gate line 111, and the sum of the light shield area of the first contact 115 and that of the gate line 111 is large.

(2) Since the gate 112a is led from the gate line 111 and used as the gate of the TFT 112, the light shield area of the gate 112a is added to the light shield area of the gate line 111.

In contact, in the liquid crystal display device 1 of the present embodiment, the region of the first contact 15 is located close to a periphery in the pixel region so that the first contact 15 overlaps with the gate line 11. Specifically, the opposite electrode hole 22 is formed above the gate line 11 in a position so that the opposite electrode hole 22 is overlapped with the gate line 11. As a result, the first contact 15 itself is formed in a position sufficiently close to the gate line 11, and the sum between the light shield area of the first contact 15 and the light shield area of the gate line 11 is further decreased.

In addition, in the liquid crystal display device 1 of the present embodiment, the gate 12a of the TFT 12 also serves as the gate line 11 (that is, a part of the gate line 11 is used as the gate of the TFT 12). In this point as well, the area of the light shield region is made smaller than that in the comparative example.

Consequently, the light shield amount is reduced as a whole and the light transmission amount is increased, so that display brightness improves.

As described above, as a result of forming the formation region of the first contact 15 close to the periphery in the pixel region so that the first contact 15 partly overlaps the gate line 11, the slit 26 in the pixel electrode 25 may be enlarged to a position closer to the gate line 11 more than the comparative case by an amount that the formation region is brought close to the overlapping part. Moreover, a part (gate 12a) of the gate line 11 is used as the gate portion of the TFT 12, so that the space in which the TFT 12 is disposed may be reduced as compared with the comparative example, and the slit 26 in the pixel electrode 25 may be enlarged by the reduction amount. Specifically, a hatched region X1 in FIG. 2 is a slit region enlarged more than that in the comparative example. When the slit region is enlarged in such a manner, the region in which the motion of the liquid crystal molecules is controlled becomes wider by the amount of enlargement of the slit region, and the transverse electric field generated between the pixel electrode 25 and the opposite electrode 21 becomes strong and stable, so that the controllability of the liquid crystal molecules becomes favorable, and display contrast improves.

Further, in the present embodiment, the overlap region 101 in which the gate line 11 and the opposite electrode hole 22 overlap is covered with the extension part 15a of the first contact 15. Consequently, a leak electric field from the gate line 11 passing through the opposite electrode hole 22 and reaching the liquid crystal layer 31 is blocked by the part (extension part 15a) of the first contact 15, and disturbance of the electric field is suppressed.

Further, in the present embodiment, the region 28 other than the inner edge region 27 facing the overlap region 101 in the inner edge region surrounding the opposite electrode hole 22 also overlaps the other extension part 15c of the first contact 15 above the first contact 15. Consequently, even if the electric field generated between the pixel electrode 25 and the opposite electrode 21 is disturbed in the region 28, the part (extension part 15c) of the first contact 15 blocks the light. As a result, the part in which liquid crystal controllability is low is prevented from contributing to display.

Further, in the present embodiment, since the pixel electrode 25 overlaps the region 28 in the opposite electrode 21, disturbance of the electric field which occurs in the case where the region 28 is not covered with the pixel electrode 25 is suppressed.

In the foregoing embodiment, the case where the region 28 other than the region 27 overlapped with the gate line 11 in the inner edge region of the opposite electrode hole 22 overlaps both of the pixel electrode 25 and the first contact 15 has been described. However, the invention is not limited thereto. The region 28 may be overlapped with at least one of the pixel electrode 25 and the extension part 15a of the first contact 15.

Figure 7:
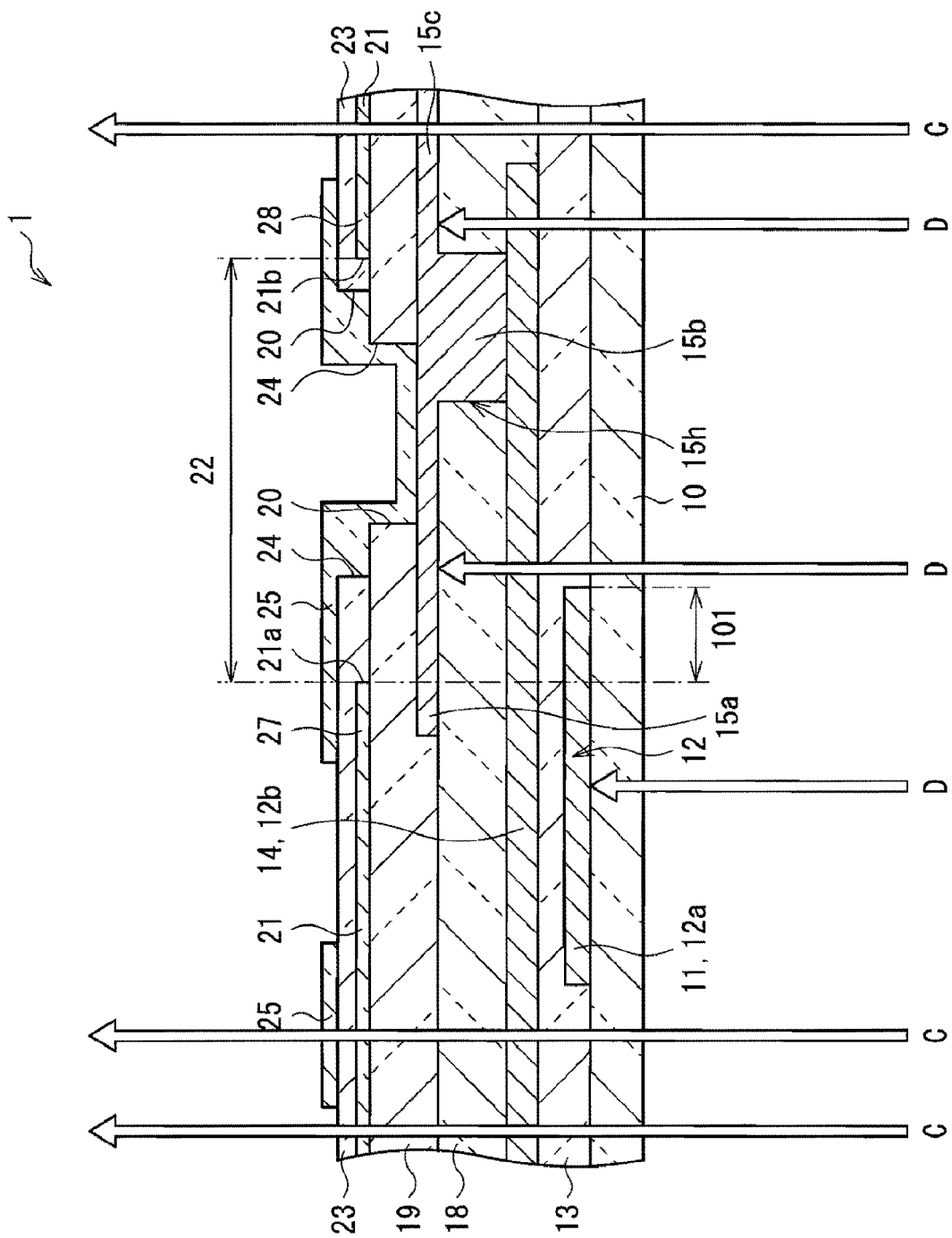
FIG. 7 is a cross section of a liquid crystal display device according to a second modification.

In addition, the liquid crystal display device 1 of the present embodiment having the configuration that the plane size of the pixel insulating film hole 24 is larger than that of the interlayer insulating film hole 20 has been described. However, the liquid crystal display device of the present invention may have a configuration that, as illustrated in FIG. 7, the plane size of the interlayer insulating film hole 20 is larger than that of the pixel insulting film hole 24. Such a liquid crystal display device may also produce effects similar to those of the liquid crystal display device 1 of the aforementioned embodiment.

Figure 8:
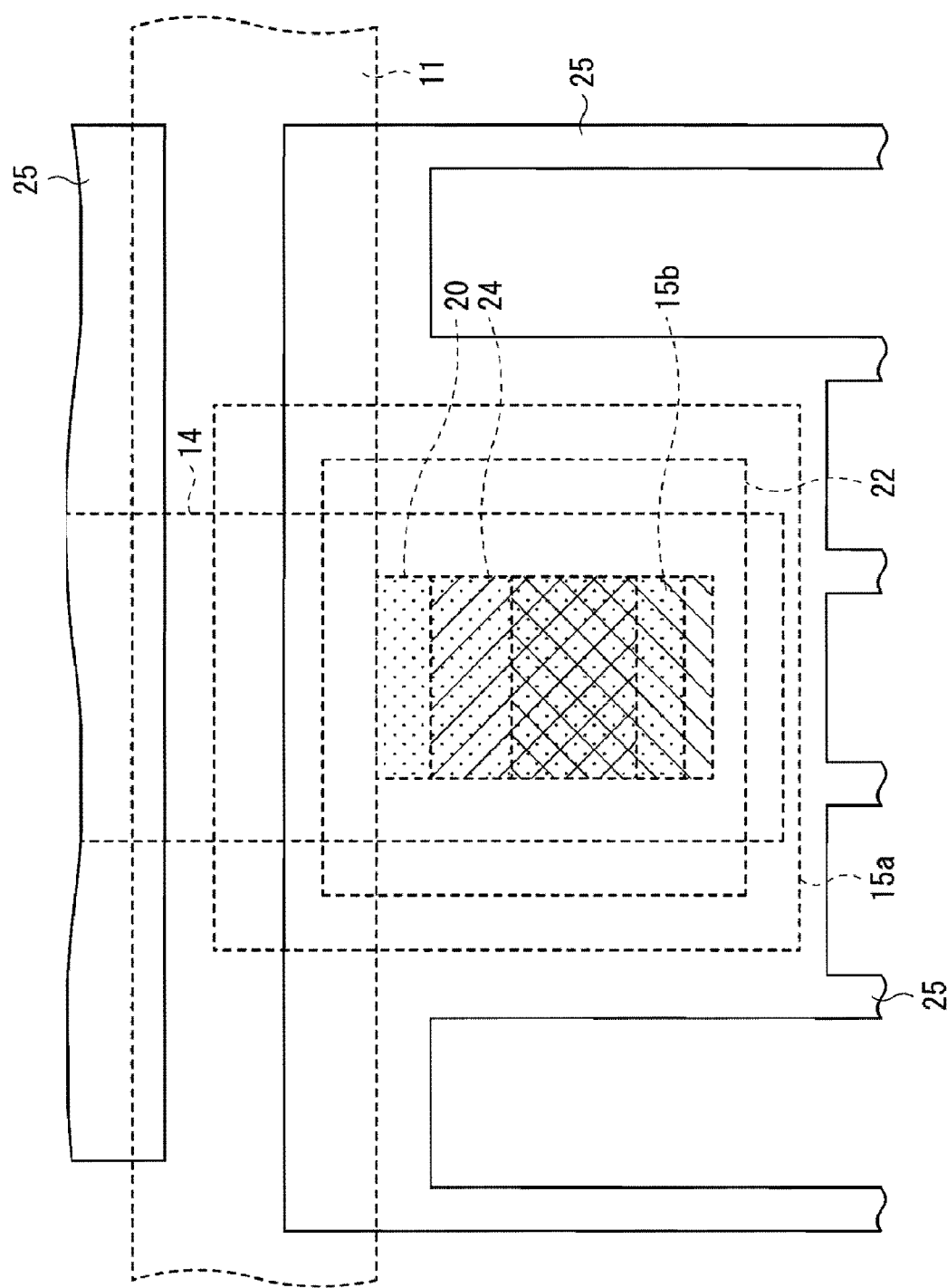
FIG. 8 is a cross section of a liquid crystal display device according to a third modification.

The liquid crystal display device 1 of the present embodiment has been described with respect to the case where the inner edge position of the pixel insulating film hole 24 and that of the interlayer insulating film hole 20 are different from each other. However, as illustrated in FIG. 8, at least one of a pair of side faces of the interlayer insulating film hole 20 (vertically hatched part) and a pair of side faces of the pixel insulating film hole 24 (obliquely hatched part) may be in the same plane. In the case of FIG. 8, the side faces in the column direction out of the side faces of the interlayer insulating film hole 20 and the pixel insulating film hole 24 are in the same plane. In addition, in the case of FIG. 8, the width of the extension part 15a of the first contact 15 is smaller than that in the case of FIG. 2. Such a liquid crystal display device 1 may also produce effects similar to those of the liquid crystal display device 1 of the aforementioned embodiment. Further, the size and the position of the pixel insulating film hole 24 may be the same as those of the interlayer insulating film hole 20. In this case, the pixel insulating film hole 24 and the interlayer insulating film hole 20 may be formed by a single process using a single etching mask.

Second Embodiment

Figure 9:
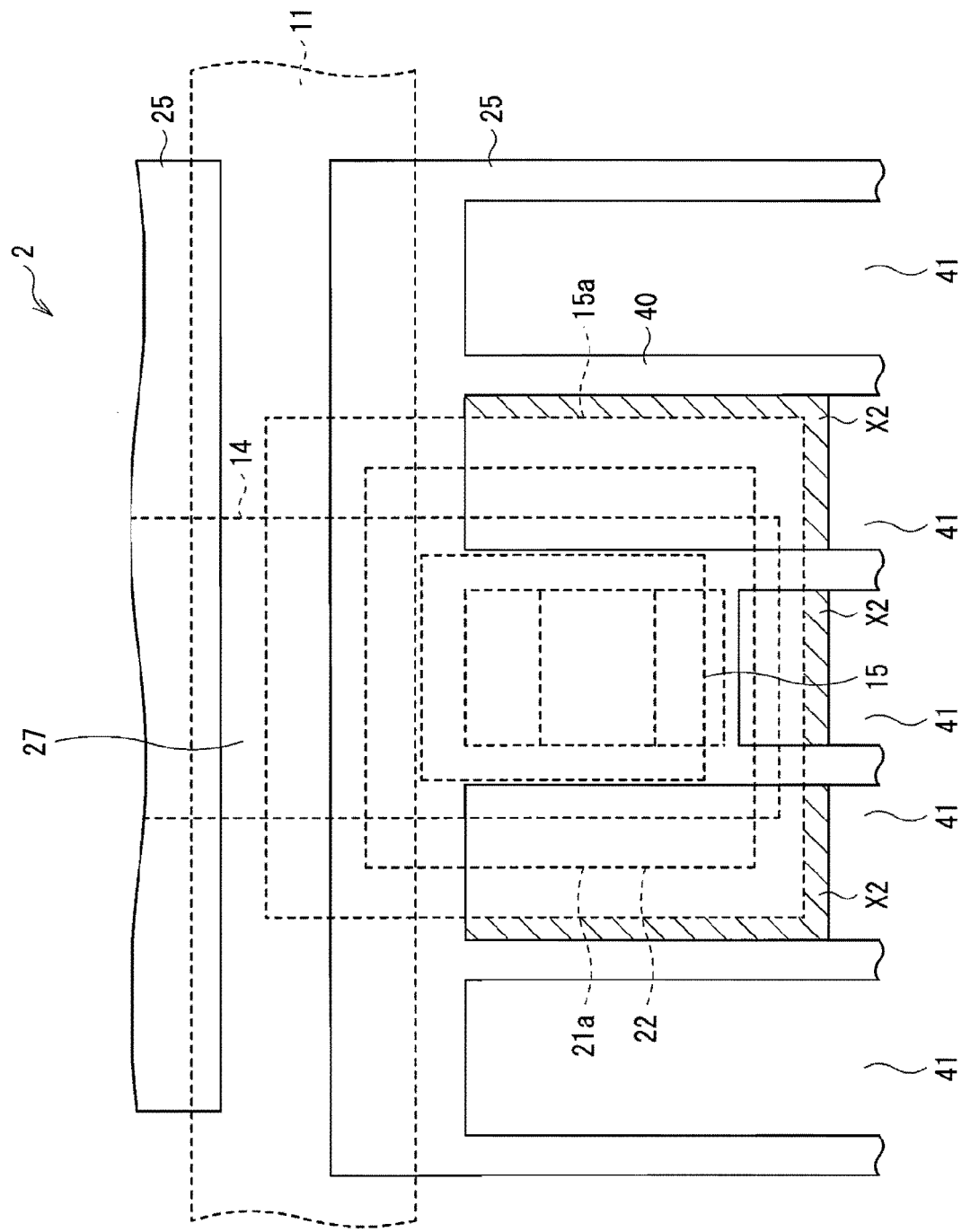
FIG. 9 is an enlarged plan view of a portion of a contact in the liquid crystal display device according to a second embodiment.

FIG. 9 is an enlarged view of a portion of the first contact 15 in a liquid crystal display device 2 according to a second embodiment. The same reference numerals are designated to components similar to those of the first embodiment, and their description will not be repeated or will be given briefly. In the liquid crystal display device 2 of the second embodiment, two more slits 41 (the second slit from the right side and the second slit from the left side) out of slits 41 formed in the pixel electrode 40 are longer than those of the first embodiment, and a part of the slits 41 overlaps the extension part 15a of the first contact 15. In the second embodiment, four slits out of the slits 26 extend close to the gate 12a of the TFT 12. Therefore, as compared with the liquid crystal display device 1 of the first embodiment, a hatched region X2 in FIG. 9 becomes an incident light transmittable region, and display brightness improves by the amount of the region.

Third Embodiment

Figure 10:
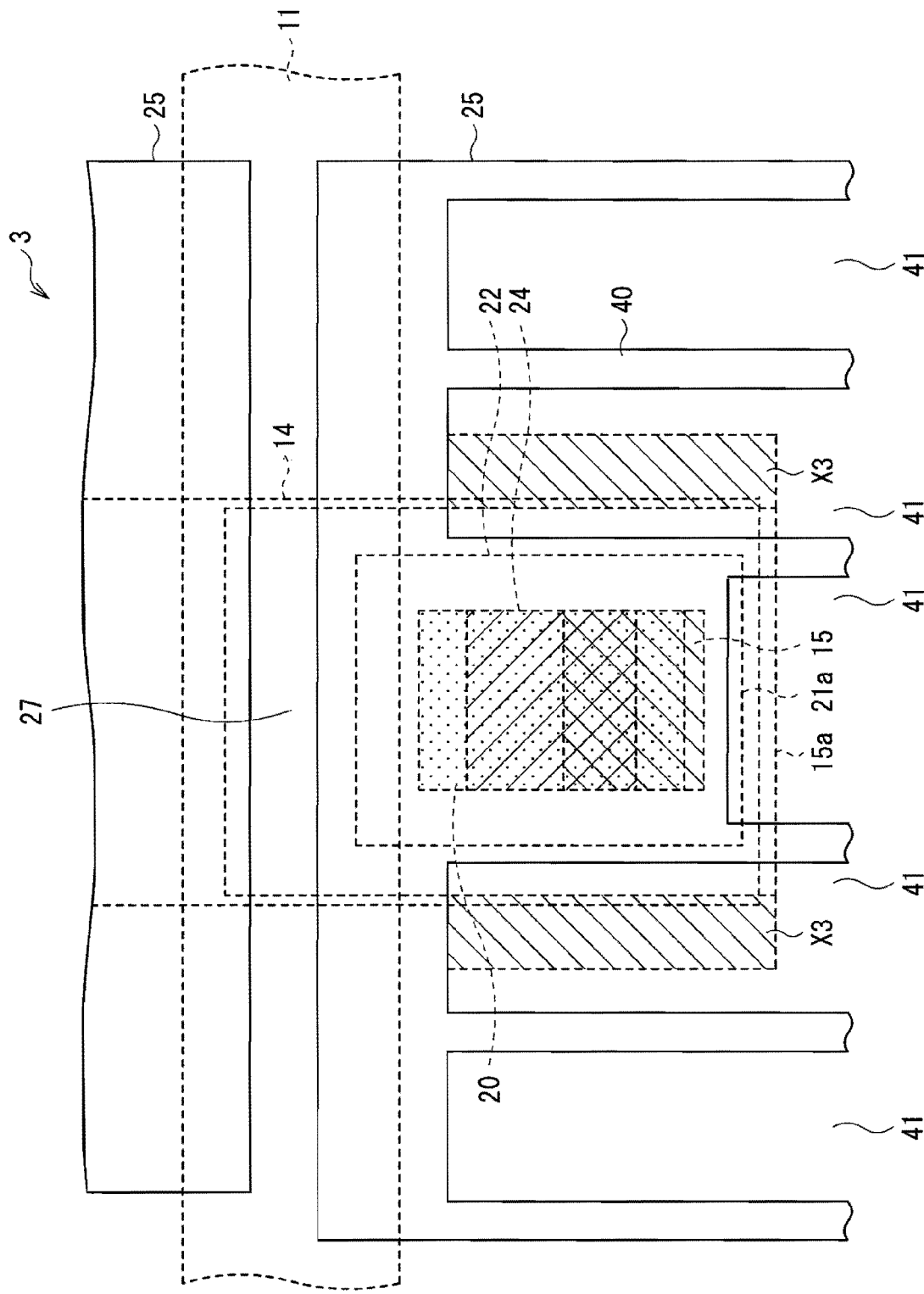
FIG. 10 is an enlarged plan view of a portion of a contact in the liquid crystal display device according to a third embodiment.

FIG. 10 is an enlarged view of a portion of the first contact 15 in a liquid crystal display device 3 according to a third embodiment. The liquid crystal display device 3 of the third embodiment is configured so that at least one of a side face in which the interlayer insulating film hole 20 is formed and a side face in which the pixel insulating film hole 24 is formed is in the same plane, and the slits 41 formed in the pixel electrode 40 are formed in a manner similar to those of the second embodiment illustrated in FIG. 9.

When all of side faces of the interlayer insulating film hole 20 and the pixel insulating film hole 24 are formed in the same plane, that is, the plane size of the interlayer insulating film hole 20 and that of the pixel insulating film hole 24 are set to the same and the holes 20 and 24 are disposed in the same position, the holes 20 and 24 may be formed by single etching. A concrete example of the process is as follows. On the top face of the transistor protection film 18, the first contact 15, and the data line 16, an insulating material which becomes the interlayer insulating film 19 is provided. After that, the opposite electrode 21 is formed as described above and, on the top face of them, an insulating material which becomes the pixel insulating film 23 is provided. Next, a mask is formed by using the photolithography technique. After that, an opening in the mask is etched to form a hole continuously penetrating from the interlayer insulating film 18 to the pixel insulating film 23.

When the photolithography process and the etching process are performed once as described above, the process is simplified, and one kind of a photomask prepared for the photolithography is sufficient. In addition, when the side face of the interlayer insulating film hole and that the pixel insulating film hole are continuous in the layer stack direction, the plane sizes of the holes 20 and 24 may be made smaller. In a manner similar to the above, the incident light transmittable region is enlarged, and transmittance is improved.

Although some embodiments and modifications have been described above, the present invention is not limited to them but may be properly modified. For example, the shape of the opening in the pixel electrode is not limited to the linear slit shape but may be another opening shape such as a bent slit shape. The shape of the contact is not limited to square shape but may be rectangle shape or other shapes.

The present application contains subject matter related to that disclosed in Japanese Priority Patent Application JP 2008-157229 filed in the Japan Patent Office on Jun. 16, 2008, the entire content of which is hereby incorporated by reference.

Obviously many modifications and variations of the present invention are possible in the light of the above teachings. It is therefore to be understood that within the scope of the appended claims the invention may be practiced otherwise than as specifically described.

What is claimed is:

1. A liquid crystal display device comprising:
    a pixel electrode with a plurality of openings;
    an opposite electrode disposed so as to face the pixel electrode with an insulating layer in-between;
    a liquid crystal layer disposed on an opposite side of the pixel electrode facing away from the opposite electrode;
    a selection line utilized to select a pixel;
    a thin film transistor disposed on the opposite side of the opposite electrode so as to drive the pixel, part of the selection line being a gate of the thin film transistor; and
    an interlayer conductor electrically connecting the thin film transistor and the pixel electrode,
    wherein,
        the opposite electrode has an opposite electrode hole which allows the interlayer conductor to be electrically connected to the pixel electrode,
        the opposite electrode hole partly overlaps the selection line, and
        the interlayer conductor has a first extending portion that overlaps part of the selection line in a plan view.

2. The liquid crystal display device according to claim 1, wherein:
    the interlayer conductor further has a second extending portion different from the first extending portion,
    a first inner edge region of the opposite electrode, which is part of a whole inner edge region surrounding the opposite electrode hole, faces an overlap region where the opposite electrode hole partly overlaps the selection line, and
    a second inner edge region of the opposite electrode, which is different from the first inner edge region, overlaps the second extending portion of the interlayer conductor or the pixel electrode, or overlaps both of the second extending portion of the interlayer conductor and the pixel electrode.

3. The liquid crystal display device according to claim 1, wherein:
    an interlayer insulating film is provided between the opposite electrode and the interlayer conductor, and
    a hole with a constant diameter is formed so as to pass through both of the insulating layer and the interlayer insulating film from the surface of the insulating layer up to the interlayer conductor.

4. The liquid crystal display device according to claim 1, wherein the openings in the pixel electrode are formed in a slit shape and extend up to closest vicinity of the selection line.

* * * * *